3,201,429
17,21 - DIESTERS OF 6α,16α-DIMETHYL-Δ⁴-PREG-
NEN-17α-21-DIOL - 3,20 - DIONE AND PROCESS
THEREFOR
Carl Djerassi and Howard J. Ringold, Mexico City, Mexico, assignors, by mesne assignments, to Syntex Corporation, a corporation of Panama
No Drawing. Filed July 8, 1959, Ser. No. 825,669
Claims priority, application Mexico, July 12, 1958,
51,550
8 Claims. (Cl. 260—397.47)

The present invention relates to cyclopentano phenanthrene derivatives and to a new method for preparing same.

More particularly, the present invention relates to the novel 6α,16α-dimethyl analogs of cortisone, hydrocortisone, prednisone and prednisolone and their esters, and also comprises the novel 6α,16α-dimethyl-Δ⁴-pregnene-17,21-diol-3,20-dione and its 1-dehydro analogs and esters.

The new compounds exhibit valuable biological effects: the 6α,16α-dimethyl analogs of such cortical hormones and their esters are potent hormones of the cortical type having anti-inflammatory and glycogenic activity; the 6α,16α - dimethyl - 17α,21 - diacyloxy - Δ⁴ - pregnene-3,20 - dione and 6α,16α - dimethyl - 17α,21 - diacyloxy-Δ¹,⁴-pregnadiene-3,20-dione show progestational activity by the oral route.

The novel compounds having hormonal properties as above described, of the present invention, can be expressed by the following general formula:

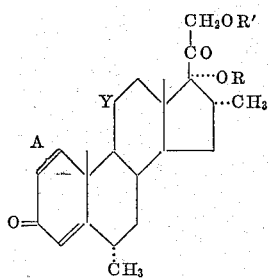

wherein A represents a single or double bond between C-1 and C-2; Y represents hydrogen or a β-hydroxy or a keto group; R and R' represent hydrogen or a hydrocarbon carboxylic acid acyl group of up to 12 carbon atoms derived from any carboxylic acid having up to 12 carbon atoms, saturated or unsaturated, or straight or branched chain, cyclic or mixed cyclic-aliphatic, substitute or not with methoxy, halogen or other groups; typically these include the acetates, propionates, butyrates, t-butyrates, hemisuccinates, enanthates, caproates, trimethylacetates, benzoates, phenoxyacetates, phenylpropionates, cyclopentylpropionates and β-chloro-propionates.

The present invention also relates to a novel method for making said new compounds, which method may be expressed by the following sequence of formulas:

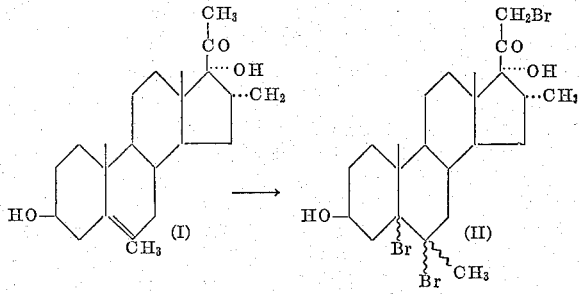

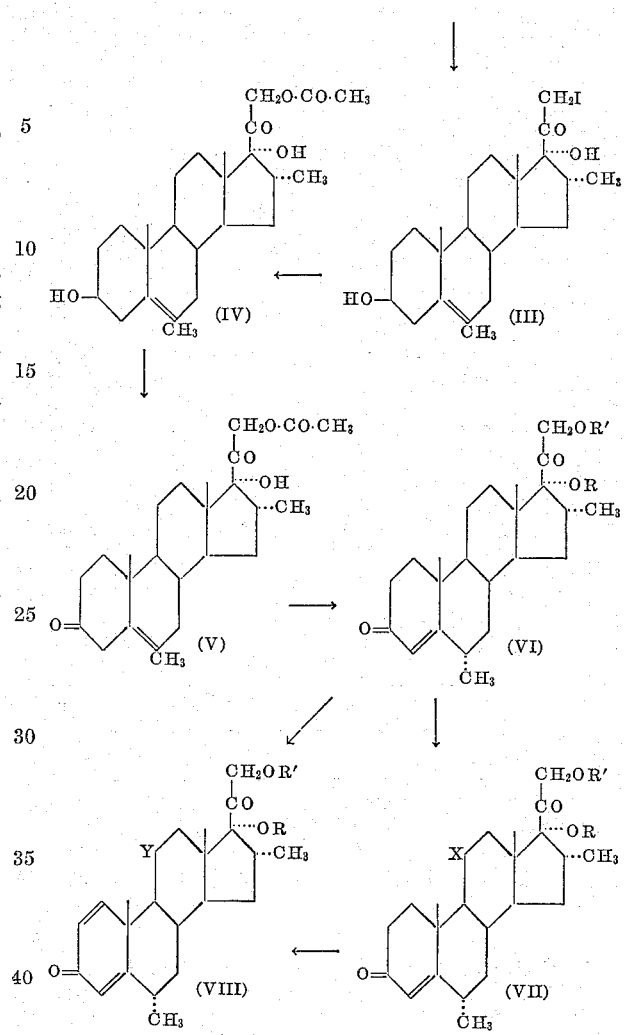

In these formulas R, R' and Y represent the same groups as heretofore set forth; X indicates a β-hydroxy or keto group.

The starting material for the preparation of these new compounds was 6,16α-dimethyl-Δ⁵-pregnene-3β,17α-diol-20-one (Formula I), the preparation of which is described in the U.S. patent application, Serial No. 773,818, filed November 14, 1958, now U.S. Patent No. 3,158,629.

Treatment of 6,16α-dimethyl-Δ⁵-pregnene-3β,17α-diol-20-one (I) with two molar equivalents of bromine in methylene dichloride solution yielded 6,16α-dimethyl-5,6,21 - tri - bromo - pregnane - 3β,17α -diol - 20 - one (II). Treatment of this tribromo compound with sodium iodide in acetone solution formed 6,16α-dimethyl-21 - iodo - Δ⁵ - pregnene - 3β,17α - diol - 20 - one (III). Treatment of this 21-iodo compound with sodium acetate in acetone solution gave 6,16α-dimethyl-Δ⁵-pregnene-3β,17α,21-triol-20-one 21 acetate (IV). Conventional ovidation of this compound with chromic acid gave 6,16α-dimethyl - Δ⁵ - pregnene - 17α,21 - diol - 3,20 - dione 21-acetate (V) and treatment of this compound with acid or base shifted the double bond to the 4(5) position. Thus we produced 6α,16α-dimethyl-Δ⁴-pregnene-17,21-diol-3, 20-dione 21-acetate.

As indicated in the above equation treatment of the 21-acetate of 6,16α-dimethyl-Δ⁴-pregnene-17α,21-diol-3, 20-dione with an anhydride of a hydrocarbon carboxylic acid of less than 12 carbon atoms in the presence of p-toluene-sulfonic acid gave the corresponding 17-acylate- 21-acetate. Other mixed esters were similarly prepared by first saponifying the 21-acetate group under conventional conditions to get the free compound and then introducing the 21-acylate group alone by conventional esterification in the presence of pyridine followed by further esterification under conditions conventional for the esterification of a 17α-hydroxy group.

By microbiological methods, such as incubation with species of *Curvularia lunata* or Cunninghamella fungi we introduced into the above compound a hydroxyl group at C–11, which conversion can be carried out either on the 21-acetate or on the free 17α,21-diol; the microbiological oxidation is accompanied by hydrolysis of the ester group at C–21, and thus in either case 6α,16α-dimethyl-hydrocortisone was obtained. (VII; R=H, R'=H, Y=β-hydroxy). Conventional oxidation of the 11β-hydroxy group with chromic acid gave the 11-keto compound.

In the 6α,16α-dimethyl analogs of hydrocortisone and cortisone just described there was introduced an additional double bond between C–1 and C–2, preferably by incubation of the 21-hydroxy or 21-acetoxy compounds with *Corynebacterium simplex*, to obtain 6α,16α-dimethyl - prednisolone and 6α,16α - dimethyl - prednisone, respectively. Alternatively, the dehydrogenation of the 21 - esters of the 6α,16α - dimethyl - hydrocortisone and of 6α,16α-dimethyl-cortisone was carried out by refluxing with selenium dioxide in t-butanol to produce the corresponding 21-esters.

The order in which the above steps of hydrolysis, esterification, oxygen introduction, oxidation of a hydroxy to a keto group, and dehydrogenation are carried out, can be modified in many ways. Thus, for instance, the 6α, 16α - dimethyl - Δ⁴ - pregnene - 17α,21 - diol - 3,20 - dione 21-acetate may be first dehydrogenated to 6α,16α-dimethyl - Δ¹,⁴ - pregnadiene - 17α,21 - diol - 3,20 - dione 21-acetate and this, in turn, may be subjected to the microbiological introduction of a β-hydroxy group in C–11, Similarly the oxidation of the β-hydroxy group to the keto group in C–11 may be carried out before or after the introduction of the double bond in the 1(2) position.

*Example I*

A solution of 10 g. of 6,16α-dimethyl-Δ⁵-pregnene-3β, 17α-diol-20-one in 50 cc. of methylene dichloride was cooled to 0° C. and under stirring, in the course of 20 minutes, treated with 9.6 g. of bromine dissolved in 24 cc. of methylene dichloride while the temperature was maintained below 15° C. The mixture was diluted with water and the methylene dichloride layer was separated and washed with water, dried over anhydrous sodium sulfate and evaporated under reduced pressure in a bath below 50° C. The residue consisted of the crude 6.16α-dimethyl - 5,6,21 - tribromo - pregnane - 3β,17α - diol-20 - one which was used for the next step without further purification. The analytical sample was obtained by recrystallization from acetone.

The above crude tribromo compound was dissolved in 200 cc. of acetone, and an excess of sodium iodide was added, approximately 40 g. The mixture was stirred for 15 minutes and then kept overnight. It was diluted with water, the product was extracted wtih methylene dichloride and the extract was washed with 3% sodium thiosulfate solution until decoloration, then with water, dried over anhydrous sodium sulfate, filtered and evaporated under reduced pressure in a bath below 40° C. There was thus obtained the crude 6,16α-dimethyl-21-iodo-Δ⁵-pregnene-3β,17α-diol-20-one. The analytical sample was obtained by recrystallization from acetone-methanol at low temperature.

The above crude 6,16α-dimethyl-21-iodo-Δ⁵-pregnene-3β,17α-diol-20-one was dissolved in 300 cc. of acetone, mixed with 45 g. of recently fused potassium acetate and refluxed for 14 hours. The mixture was concentrated to a small volume, diluted with water and extracted with ether. The extract was washed with water, dried over anhydrous sodium sulfate, filtered and concentrated to a small volume. Upon cooling there crystallized 6,16α-dimethyl - Δ⁵ - pregnene - 3β17α,21 - triol - 20 - one 21-acetate. The analytical sample was obtained by recrystallization from acetone.

A solution of 10 g. of 6,16α-dimethyl-Δ⁵-pregnene-3β,17α,21-triol-20-one 21-acetate in 200 cc. of acetone was cooled to 0° C. and mixed with an 8 N solution of chromium acid prepared by dissolving 1.1 equivalent of chromium trioxide in concentrated sulfuric acid and water. The addition was effected rapidly, with stirring under an atmosphere of nitrogen maintaining the temperature at around 0° C.; the mixture was kept under nitrogen at 0° C. for 5 minutes longer and then diluted with water and extracted with ether; the extract was washed with water, dried over anhydrous sodium sulfate and evaporated. The residue crystallized from acetone-hexane to give 6,16α-dimethyl-Δ⁵-pregnene-17α,21-diol-3, 20-dione 21-acetate.

A solution of 8 g. of the above compound in 80 cc. of methanol was mixed with 3 cc. of concentrated hydrochloric acid and stirred for 3 minutes at room temperature, diluted with water and extracted with methylene dichloride; the extract was washed with water, dried over anhydrous sodium sulfate and evaporated to dryness. Recrystallization of the residue from acetone-hexane yielded 6α,16α - dimethyl - Δ⁴ - pregnene - 17α,21 - diol - 3,20-dione 21-acetate. Conventional saponification yielded the free 17α,21-diol.

A culture of *Curvularia lunata*, NRRL 2380, was prepared by inoculating an aqueous medium containing 2% of peptone and 5% of corn syrup with a culture of such fungus, prepared in a medium of the same characteristics, and then incubating at 28° C. under aeration and stirring for 48 hours. To each liter of this culture there was added 30 cc. of the recently prepared ethanol solution of 1% 6α,16α - dimethyl-Δ⁴-pregnene-17α,21-diol-3,20-dione 21-acetate, and the mixture was stirred with aeration for 48 hours at 28° C. The product was extracted several times with methylene dichloride and the extract was washed with water, dried over anhydrous sodium sulfate and concentrated to a small volume. The concentrated extracts from several simultaneous experiments, representing a total of 3 g. of 6α,16α-dimethyl-Δ⁴-pregnene-17α,21-diol-3,20-dione, were combined and the solution was then chromatographed on silica gel. The solids obtained upon evaporation of the eluates were purified by crystallization from acetone-hexane. There was thus obtained 6α,16α-dimethyl-hydrocortisone.

Two g. of 6α,16α-dimethyl-hydrocortisone was treated with 1.1 equivalents of 8 N chromic acid solution by an analogous method to that described above for the oxidation of hydroxyl group at C–3 of 6,16α-dimethyl-21-acetoxy-Δ⁵-pregnene-3β,17α-diol-20-one. There was thus obtained 6α,16α-dimethyl-cortisone which was purified by crystallization from acetone-hexane.

A mixture of 1.8 g. of 6α,16α-dimethyl-cortisone 10 cc. of pyridine with 2 cc. of acetic anhydride was kept overnight at room temperature, poured into water, heated on the steam bath for half an hour, and the precipitate was collected by filtration, washer with water, dried and recrystallized from acetone-hexane. There was thus obtained 6α,16α-dimethyl-cortisone 21-acetate.

A mixture of 1 g. of 6α,16α-dimethyl-cortisone 21-acetate, 50 cc. of t-butanol, 0.4 g. of recently sublimed selenium dioxide and 0.2 cc. of pyridine was refluxed for 48 hours under an atmosphere of nitrogen, filtered through Celite, the filter was washed with hot t-butanol, and the combined filtrate and washings was evaporated to dryness under reduced pressure. The residue was dissolved in acetone, decolorized with charcoal, filtered and the solution was evaporated to dryness. Chromatography of the residue on neutral alumina furnished 6α,16α-dimethyl-prednisone 21-acetate.

Example II

6α,16α-dimethyl-hydrocortisone was acetylated at C-21 by the described reaction with acetic anhydride in pyridine solution (see the previous example) and then the 11β1hydroxyl group was oxidized to the keto group, to produce 6α,16α-dimethyl-cortisone 21-acetate. In this case the oxidation was carried out by reaction with an excess of chromium trioxide in solution in 80% acetic acid at room temperature for 2 hours, and the product was then isolated by precipitation in water, filtration and recrystallization from acetone-hexane, to produce 6α,16α-dimethyl-cortisone 21-acetate identical with the compound obtained in accordance with the previous example.

Example III

In the method of Example No. 1 there was substituted for the culture of *Curvularia lunata*, a culture of *Cunninghamella bainieri*, ATCC 9244, similarly prepared by inoculating the aforementioned medium with a culture of such fungus and subsequent incubation for 24 hours. To this culture there was added an ethanol solution of 6α16α - dimethyl-$\Delta^4$-pregnene-17α,21-diol-3,20-dione 21-acetate and the mixture was incubated for 24 hours, such as has been described for the incubation with *Curvularia lunata*. The incubation product was extracted with methylene dichloride and the extract was washed and concentrated, in accordance with Example No. 1. Finally, the extracts from several such incubations were combined, representing a total of 3 g. of the starting 6α,16α-dimethyl-$\Delta^4$-pregene-17α,21-diol-3,20-dione 21-acetate.

The combined concentrated extracts were adsorbed in a column of a mixture of 60 g. of silica gel and 60 g. of Celite, previously washed with methylene dichloride. The column was eluted with a mixture of methylene dichloride and acetone (80:20) and evaporation of the eluates afforded solid residues which were combined and recrystallized from a mixture of methylene dichloride and acetone. There was thus obtained 6α,16α-dimethyl-hydrocortisone, identical with the one obtained in accordance with Example I.

Example IV

The acetoxy group of 6α,16α-dimethyl-$\Delta^4$-pregnene-17α,21-diol-3,20-dione 21-acetone was hydrolyzed for example by treatment of 1 g. of the steroid with 10 cc. of a methanol solution of sodium methoxide (from 60 mg. of sodium), under anhydrous conditions, under an atmosphere of nitrogen and for 1 hour. The hydrolysis product was poured into 50 cc. of an aqueous saturated sodium chloride solution containing a few drops of acetic acid, and the precipitate was collected, washed with saturated sodium chloride solution, dried and recrystallized from acetone-hexane. The subsequent incubation with *Curvularia lunata* or Cunninghamella of the free 6α,16α-dimethyl - $\Delta^4$-pregnene-17α,21-diol-3,20-dione afforded 6α 16α-dimethyl-hydrocortisone, identical with the one obtained in accordance with Examples I and III.

Example V

Thirty 125 cc. Erlenmeyer flasks were charged with 30 cc. of a 1% aqueous medium of yeast extract and the contents of each flask were inoculated with a culture of *Corynebacterium simplex*, ATCC 6046, obtained by incubation of a 1% aqueous medium of yeast extract with a suspension of such bacteria, for 24 hours. The medium thus inoculated was stirred for 24 hours at 28° C. There was thus obtained a culture of Corynebacterium which was used in the following incubation of 6α,1α-dimethyl-hydrocortisone obtained in accordance with the previous examples.

To each flask there was added 1 cc. of a 1% ethanol solution of the steriod, which solution had been prepared with recently distilled ethanol just before its use. The mixture was then incubated at 28° C. under continuous stirring and for 24 hours; in other experiments the incubation period was continued for a period of time up to 72 hours.

The contents of the flask were combined and the total was divided in three portions; each portion was extracted with 5 portions of methylene dichloride, using 500 cc. of the latter for each portion. The extracts were combined, washed with water, dried over anhydrous sodium sulfate and evaporated. The residue was chromatographed on washed alumina and the solid fractions eluted with mixtures of benzene and ether were recrystallized from ethyl acetate, thus furnishing 6α,16α-dimethyl-prednisolone.

By treatment with acetic anhydride in pyridine solution, in accordance with the method of acetylation described in Example I, there was obtained 6α,16α-dimethyl-prednisolone 21-acetate.

Example VI

By the method of the previous example, 6α,16α-dimethyl-cortisone 21-acetate was incubated with *Corynebacterium simplex*, to produce 6α,16α-dimethyl-prednisone.

Example VII

By treatment of 6α,16α-dimethyl-hydrocortisone 21-acetate, of Example I, with selenium dioxide, following the method described for this reaction in such example, there was obtained 6α,16α-dimethyl-prednisolone 21-acetate, identical with the final compound of Example V.

Example VIII

The hydroxyl group at C-21 of 6α,16α-dimethyl-hydrocortisone was esterified by treatment with an excess of propionic anhydride in pyridine solution, in accordance with the method of acetylation of the 21-hydroxyl group described in Example I, and the resulting 6α,16α-dimethyl-hydrocortisone 21-propionate was refluxed with selenium dioxide, following the method described in this same example, to produce 6α,16α-dimethyl-prednisolone 21-propionate.

Example IX

By the method of Example VIII, there was formed 6α,16α-dimethyl-cortisone 21-cyclopentylpropionate and then an additional double bond at C-1 was introduced by the reaction with selenium dioxide.

Example X

A mixture of 1 g. of 6α,16α-dimethyl-$\Delta^4$-pregnene-17α,21-diol-3,20-dione, 100 cc. of benzene, 2 cc. of propionic anhydride and 100 mg. of p-toluenesulfonic acid was kept at a temperature around 25° C. for 48 hours. After pouring into water, the benzene layer was separated, washed with water, dried over anhydrous sodium sulfate and evaporated to dryness. Recrystallization of the residue from acetone-hexane yielded 6α,16α-dimethyl-$\Delta^4$-pregnene-17α,21-diol-3,20-dione dipropionate.

In this compound there was introduced an additional double bond between C-1 and C-2 to furnish 6α,16α-dimethyl-$\Delta^{1,4}$-pregnadiene-17α,21-diol-3,20-dione dipropionate. This introduction was achieved by refluxing with selenium dioxide, under exactly the same conditions as described in Example I.

Example XI

By the method of the previous example, the hydroxyl group at C-17 of 6α,16α-dimethyl-$\Delta^4$-pregnene-17α,21-diol-3,20-dione 21-acetate was converted into the propionoxy group, and upon subsequent dehydrogenation there was obtained 6α,16α-dimethyl-$\Delta^{1,4}$-pregnadiene-17α,21-diol-3,20-dione 17-propionate 21-acetate.

Examples XII

Following the method of Examples VIII, IX, X and XI, using other carboxylic acid anhydrides having up to 12 carbon atoms, there were obtained the corresponding diesters of 6α,16α-dimethyl-$\Delta^4$-pregnene-17α,21-diol-3,20-dione and of 6α,16α-dimethyl-$\Delta^{1,4}$-pregnadiene-17α,21- diol-3,20-dione, respectively, wherein the diesters were formed with the same or different radicals. Specifically there were formed for example the 17,21-dibenzoates, 17,21-dicyclopentylpropionates, etc.

What is claimed is:

1. In the process of producing compounds of the following formula

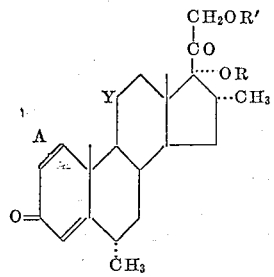

wherein A is selected from the group consisting of a single and a double bond between C–1 and C–2; Y is selected from the group consisting of hydrogen, β-hydroxy and keto; R and R' are selected from the group consisting of hydrogen and hydrocarbon carboxylic acid acyl groups of up to 12 carbon atoms, the steps which comprise treating 6,16α-dimethyl-Δ⁵-pregnene-3β,17α-diol-20-one with 2 mols of bromine to produce 6,16α-dimethyl-5,6,21-tribromo-pregnane-3β,17α-diol-20-one, followed by treatment with sodium iodide and sodium acetate to form 6,16α-dimethyl-Δ⁵-pregnene-3β,17α,21-triol-20-one 21 acetate, oxidizing with chromic acid to form 6,16α-dimethyl-Δ⁵-pregnen-17α,21-diol-3,20-dione 21 acetate and then treating the latter compound with a mineral acid to form 6α,16α-dimethyl-Δ⁴-pregene - 17α,21-diol-3,20-dione 21-acetate.

2. In the process of producing compounds of the following formula

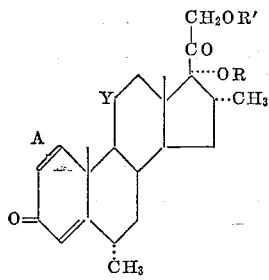

wherein A is selected from the group consisting of a single and a double bond between C–1 and C–2; Y is selected from the group consisting of hydrogen, β-hydroxy and keto; R and R' are selected from the group consisting of hydrogen and hydrocarbon carboxylic acid acyl groups of up to 12 carbon atoms, the steps which comprise treating 6,16α-dimethyl-Δ⁵-pregnene-3β,17α-diol-20-one with 2 mols of bromine to produce 6,16α-dimethyl-5,6,21-tribromo-pregnane-3β,17α-diol-20-one, followed by treatment with sodium iodide and sodium acetate to form 6,16α-dimethyl-Δ⁵-pregnene-3β,17α,21-triol-20-one 21 acetate, oxidizing with chromic acid to form 6,16α-dimethyl-Δ⁵-pregnen-17α,21-diol-3,20-dione 21 acetate, then treating the latter compound with a mineral acid to form 6α,16α-dimethyl-Δ⁴-pregnene - 17α,21 - diol-3,20-dione 21-acetate and subjecting the latter compound to incubation with a microorganism selected from the group consisting of *Curvularia lunata* and *Cunninghamella* to form 6α,16α-dimethyl-Δ⁴-pregnene-11β,17α,21-triol-3,20-dione.

3. The process of claim 2 wherein the 6α,16α-dimethyl-Δ⁴-pregnene-11β,17α,21-triol-3,20-dione is treated with chromic acid to produce 6α,16α-dimethyl-Δ⁴-pregnene-17α,21-diol-3,11,20-trione.

4. 6,16α - dimethyl - 5,6,21-tribromo - pregnane-3β,17α-diol-20-one.

5. The 17,21-diesters of hydrocarbon carboxylic acids of up to 12 carbon atoms of 6α,16α-dimethyl-Δ⁴-pregnen-17α,21-diol-3,20-dione.

6. 6α,16α-dimethyl-Δ⁴-pregnen - 17α,21-diol,3,20-dione diacetate.

7. The 17,21-diesters of hydrocarbon carboxylic acids of up to 12 carbon atoms of 6α,16α-dimethyl-Δ¹,⁴-pregnadien-17α,21-diol-3,20-dione.

8. 6α,16α - dimethyl-Δ¹,⁴-pregnadien-17α,21-diol-3,20-dione diproprionate.

References Cited by the Examiner

UNITED STATES PATENTS

| | | | |
|---|---|---|---|
| 2,688,624 | 9/54 | Moffett | 260—397.47 |
| 2,837,464 | 6/58 | Nobile | 195—51 |
| 2,897,218 | 7/59 | Sebek et al. | 260—397.45 |
| 2,940,968 | 6/60 | Sletzinger et al. | 260—239.55 |
| 3,004,994 | 10/61 | Arth et al. | 260—397.45 |
| 3,094,523 | 6/63 | Sletzinger et al. | 260—239.55 |
| 3,147,290 | 9/64 | Spero | 260—397.47 |

OTHER REFERENCES

Arth et al. 80 J.A.C.S. 3160 (June 1958).

LEWIS, GOTTS, *Primary Examiner*.

LESLIE H. GASTON, MORRIS LIEBMAN, IRVING MARCUS, *Examiners*.